Nov. 25, 1952 M. H. LEVI 2,619,245
BOTTLE AND CUP COMBINATION
Filed Nov. 5, 1949
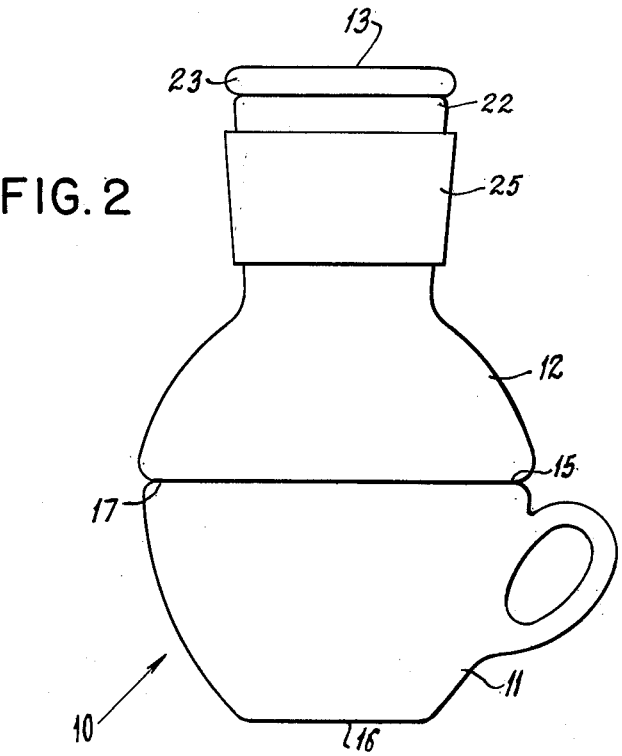
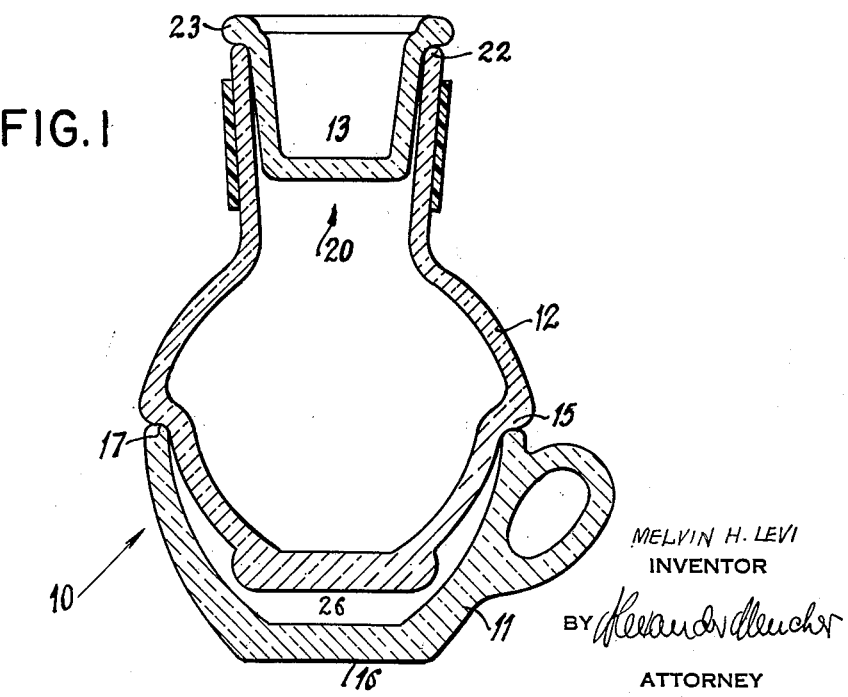
MELVIN H. LEVI
INVENTOR Patented Nov. 25, 1952

2,619,245

UNITED STATES PATENT OFFICE 2,619,245

BOTTLE AND CUP COMBINATION

Melvin H. Levi, Kew Gardens, N. Y.

Application November 5, 1949, Serial No. 125,780

1 Claim. (Cl. 215—10)

This invention relates to an individual coffee or other service for maintaining the same hot or cold and an object of this invention is to provide an improved combination of cup, bottle and creamer which may be assembled in compact form. The invention will be of particular service in hotels, hospitals, restaurants, dining cars and the like, where it is customary for a waiter or nurse to carry individual orders of fluids to the patron or patient, and where it is an advantage to have all the essentials of a cup of fluid assembled in compact form for delivery as a unit, with assurance that the assembled dishes can rest in a small space until the patron or patient is ready for his beverage or other edible.

Another object of this invention is to provide an individual drinking service, assembled in compact form for convenient transport on a cup or other receptacle to a desired destination where all of the essentials for a drink will be at hand.

Another object of this invention is to provide an individual drinking service wherein a cup or receptacle bottle and creamer, if used for coffee or tea, are adapted for compact interfitting assembly as a unit for a convenient transport to a patron or patient, the creamer when used serving as a stopper for closing the filling opening in the bottle.

Another object of this invention is to provide a combined stopper and individual creamer when used for coffee, tea or other beverage requiring additional constituents arranged to be mounted on top of the bottle to close the filling opening in the bottle.

With the above and other objects in view, the invention will be hereinafter more particularly described, and the combination and arrangement of parts will be shown in the accompanying drawings and pointed out in the claim which form part of this specification.

Reference will now be had to the drawings, wherein like numerals of reference designate corresponding parts throughout the several views, in which:

Figure 1 is a central cross-sectional view of an individual drinking service having the members thereof formed and assembled in accordance with this invention, the creamer or stopper shown being usable depending upon the nature of the drink.

Figure 2 is an elevational view of the assembled device shown in Figure 1.

In the illustrated embodiment of the invention, the numeral 10 indicates an assembly of a cup or receptacle 11, a bottle 12 and a stopper 13 for cream or other food-stuff. Stopper 13 need not be used in the combination. The cup 11 preferably has a capacity for holding an individual serving of a hot or cold beverage or other edible fluid, which may be one cup or two cups as desired. The bottle 12 has an annular flange 15 which is of larger diameter than the upper portion of the cup 11. The annular flange 15 lies in a horizontal plane parallel to the base 16 of the cup 11.

The cup 11 has a rim 17 which is positioned higher than a handle 18 on the cup, when a receptacle such as a cup is used. The bottle is thereby adapted to rest on the rim 17. The remainder of the cup or receptacle may be of a conventional shape. The bottle has a filling opening 20 of cylindrical upright form and defined by a rim 22.

The stopper or creamer 13 has an annular rim 23 and is of a convenient capacity to hold additional ingredients. The stopper has an outer diameter adapted to freely enter inside the filling opening 20. The stopper is further mounted on the bottle with its annular rim 23 resting on the upper surface of the rim 22 of the bottle. The diameter of the annular rim 23 of the stopper 13 is larger than the outer diameter of the filling opening 20 so as to be easily grasped by the user when it is desired to remove the stopper from the bottle. A plastic or other type collar 25 may be secured to the outer surface of the filling opening 20 of the bottle 12, the material serving to facilitate handling of the bottle when hot or cold.

It is to be noted that the bottle 12 when used for hot or cold coffee is an individual coffee carafe and that it is constructed of any suitable material such as glass, metal, ceramic, plastic or combinations of these materials and is so shaped that its lower part fits into the coffee cup 11. The coffee bottle is held in place on the cup by means of the annular flange or rim 15 which rests on the rim 17 of the cup 11.

When serving hot coffee to a guest heretofore, the coffee was brought from the kitchen to the table in a cup and saucer and the coffee became cold when not consumed in entirety within a short time. The coffee bottle keeps the coffee hot in transit from the kitchen to the table and maintains the cup hot because there is a transfer of heat from the glass of the bottle to the cup. In other words, the guest receives coffee piping hot in this new form of serving and the coffee remains hot instead of the usual cup of coffee which is often chilled merely during the trip from the kitchen to the table.

As shown in Figure 1, an air space 26 is formed between the lower surface of the bottle 12 and the inner surface of the cup 11. The confined body of air is a poor conductor of heat for serving hot or cold coffee and this minimizes the escape of such heat from the lower portion of the bottle.

A collar or sheath 25 may be provided which is of insulating material and has low heat conductivity characteristics. It will not absorb heat to any great degree and will not burn or chill the user's hand when handling a hot or cold bottle.

It is to be observed that while carrying the bottle and receptacle in transit, there is little chance of spillage as in the case of serving coffee or other fluids directly in cups or other receptacles.

It is understood that the bottle herein described may be used with or without the described stopper and that the cup 11 may be in the form of a glass or other receptacle to dispense other drinks such as cold alcoholic and non-alcoholic beverages.

When the combination of bottle and receptacle is before the individual patron, guest or patient, the contents of the bottle are poured into the receptacle.

I wish it understood that minor changes and variations in the shape, material, position and integration of parts may all be resorted to without departing from the spirit of the invention and the appended claim.

I claim:

In an individual edible fluid dispensing service of the character described, a bottle, having a closed flat bottom, adapted to sit on a drinking cup and adapted to be carried thereby, and the cup being capable of receiving a portion at a time of the contents of the bottle, said bottle having an elongated and relatively wide, hand grippable, pouring neck, and an intermediate body portion, said intermediate portion being substantially hemispherical and conforming substantially to the size and shape of the cup, the bottle further having a bottom portion, following the contour of the inner surface of the side and bottom walls of the cup and being of smaller dimensions to form a dead air space in cooperation with the inner surface of the side and bottom walls of the cup, a downwardly facing annular shoulder extending between the intermediate body portion and the bottom portion of the bottle for which the upper edge of the cup forms a seat whereby the bottle is maintained upon the cup in a state of equilibrium, said air space tending to maintain the fluid contents in the bottom portion of the bottle at substantially constant temperature, said intermediate portion of the bottle extending upwardly and converging toward the neck whereby the center of gravity of the bottle lies substantially above the upper edge of the cup, said bottle and cup being selectively capable of use as a unit or as members of a dispensing set.

MELVIN H. LEVI.

REFERENCES CITED

The following references are of record in the file of this patent:

UNITED STATES PATENTS

| Number | Name | Date |
|---|---|---|
| 139,081 | Ripley | May 20, 1873 |
| 378,752 | Ader | Feb. 28, 1888 |
| 506,156 | Chase | Oct. 3, 1893 |
| 739,616 | Oxley | Sept. 22, 1903 |
| 1,609,447 | Ward | Dec. 7, 1926 |
| 1,806,479 | Lory | May 19, 1931 |
| 2,072,630 | Ferry | Mar. 2, 1937 |
| 2,169,778 | Wildermann | Aug. 5, 1939 |
| 2,374,092 | Glaser | Apr. 17, 1945 |
| 2,469,032 | Chaudron | May 3, 1949 |
| 2,533,349 | Burger | Dec. 12, 1950 |

FOREIGN PATENTS

| Number | Country | Date |
|---|---|---|
| 497,688 | France | Sept. 22, 1919 |
| 740,184 | France | Nov. 12, 1932 |

OTHER REFERENCES

Premium Practice, page 38, published November 1938.

Premium Practice, page 29, published December 1938.